United States Patent [19]
Michel et al.

[11] Patent Number: 5,561,588
[45] Date of Patent: Oct. 1, 1996

[54] ELECTRICAL CAPACITOR, PARTICULARLY AN ELECTROLYTE CAPACITOR

[75] Inventors: Hartmut Michel; Rainer Hebel, both of Heidenheim; Hans-Peter Kocher, Nattheim, all of Germany

[73] Assignee: Siemens Matsushita Comp. GmbH & Co. KG, Munich, Germany

[21] Appl. No.: 545,039

[22] Filed: Oct. 19, 1995

[30] Foreign Application Priority Data

Nov. 3, 1994 [DE] Germany .................. 44 39 272.9

[51] Int. Cl.⁶ .................................................. H01G 9/08
[52] U.S. Cl. ........................ 361/537; 361/519; 361/811
[58] Field of Search .................. 174/52.5; 361/517–521, 361/535–539, 782, 811

[56] References Cited

U.S. PATENT DOCUMENTS 2,181,607 11/1939 Poitras .

FOREIGN PATENT DOCUMENTS

| 0046263A2 | 2/1982 | European Pat. Off. . |
|---|---|---|
| 0452641A1 | 10/1991 | European Pat. Off. . |
| 931114 | 8/1955 | Germany . |
| 3447851A1 | 8/1985 | Germany . |
| 3630815A1 | 3/1988 | Germany . |
| 3807626A1 | 11/1989 | Germany . |
| 2013978 | 8/1979 | United Kingdom . |
| 2154062 | 8/1985 | United Kingdom . |

*Primary Examiner*—Bot L. Ledynh
*Attorney, Agent, or Firm*—Hill, Steadman & Simpson

[57] ABSTRACT

An electrical capacitor, particularly an electrolyte capacitor, that is built into a housing, particularly a metallic housing, has a male fastening member at the floor with the assistance of which the capacitor is secured to a fastening plate in vibration-proof fashion. The male fastening member is fixed with a snap mount composed of an insulating material that is pressed in a bore of the fastening plate. A formed portion that presses the snap mount against the fastening plate is arranged at the snap mount. The male fastening member comprises a constriction into which parts of the snap mount engage.

8 Claims, 1 Drawing Sheet

ELECTRICAL CAPACITOR, PARTICULARLY AN ELECTROLYTE CAPACITOR

BACKGROUND OF THE INVENTION

The invention is directed to an electrical capacitor, particularly an electrolyte capacitor, that is built into a housing, particularly a metallic housing, that has a male fastening member at the floor with the assistance of which the capacitor is secured to a fastening plate in vibration-proof fashion.

Such capacitors are known and are described, for example, in the Siemens Matsushita Components Data Book, "Aluminium-Elektrolytkondensatoren", 1994 Edition, pages 122 through 128. The male fastening member therein comprises a thread, so that the capacitor can be screwed to the fastening plate with a plastic nut. Since the fastening plate is usually made of metal because of the required heat elimination, and the cathode is generally connected to the metal housing in electrolyte capacitors, steps must be taken to assure the required insulation between capacitor and fastening plate. This occurs with a perforated insulator washer or disk and insulating envelope in insulated capacitors, or occurs with an insulating film (perforated) between capacitor and fastening plate in non-insulated capacitors. Mounting the capacitors on the fastening plate thus assumes work from both sides, since the capacitor must be held fast at the one side of the fastening plate, whereas the screwing is undertaken from the other side of the fastening plate. Another complicating factor in this type of assembly is that specific, maximum tightening moments dare not be exceeded.

SUMMARY OF THE INVENTION

An object of the present invention is to improve the capacitor of the type initially cited such that the mounting of the capacitors on the fastening plate can occur in a simple way, whereby non-insulated capacitors can also be secured to metallic fastening plates.

This object is achieved according to the invention in that the male fastening member is fixed with a snap mount composed of an insulating material that is pressed in a bore of the fastening plate. A formed portion that presses the snap mount against the fastening plate is arranged at the snap mount. The male fastening member comprises a constriction into which parts arranged at the snap mount engage.

The invention is set forth on greater detail below with reference to exemplary preferred embodiments.

DESCRIPTION OF THE PREFERRED EMBODIMENTS

Figure 1:
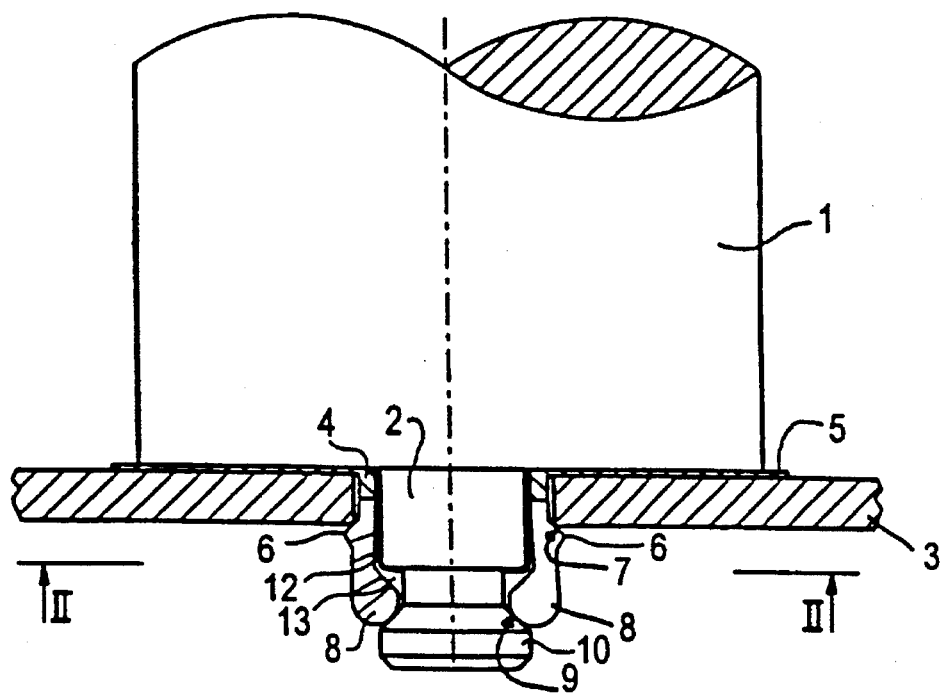
FIG. 1 is an electrolyte capacitor that is fixed at a fastening plate with a snap mount.

FIG. 1 shows the housing into which an electrolyte capacitor is integrated. A male fastening member 2 that comprises a constriction 13 is arranged at the floor of the housing 1. The housing 1 is secured to a metallic fastening plate 3, whereby the male fastening member 2 is conducted through a hole 4 arranged in the fastening plate 3.

Before assembly of the housing 1, a snap mount 5 that has formed portions 6 with bevelled surfaces 7 is plugged through the hole 4. The snap mount 5 is formed of insulating material. As a result of these bevelled surfaces 7, the snap mount is pressed against the fastening plate 3 after being pressed into the fastening plate 3, so that a good fixing of the snap mount 5 against the fastening plate 3 is achieved.

After the fixing of the snap mount 5, the housing 1 is pressed into this arrangement with its male fastening member 2. The parts 8 of the snap mount 5 thereby engage into the constriction 13 applied at the male fastening member 2. The housing 1 is drawn against the snap mount 5 and thus against the fastening plate 3 as well due to the bevelled surfaces 9 applied in the section 10 following the constriction 3. A dependable, vibration-proof connection between housing 1 and fastening plate 3 can thereby be achieved.

Deviations in dimension can also be compensated by the bevelled surfaces 6 and 9 of the snap mount 5 or at the male fastening member 2, and a compensation of tolerances required under certain circumstances is also provided.

Figure 2:
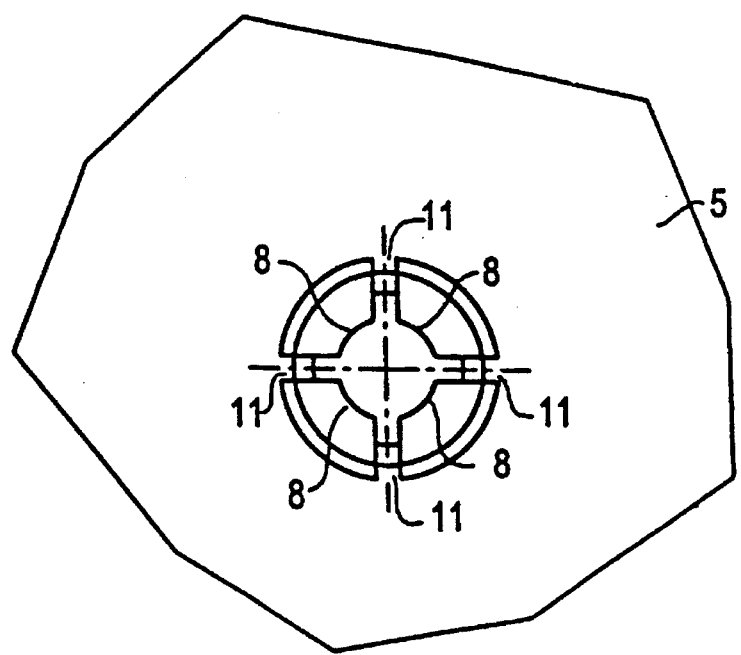
FIG. 2 is a view of the snap mount of FIG. 1.

Since the air gap between male fastening member 2 and fastening plate 3 can be diminished by the slots 11 in the snap mount 5 visible in FIG. 2, an insulation member 12 (for example, a shrink hose or the like) can either be arranged at the male fastening member or an additional insulating cap (not shown in the drawing) can be present between fastening plate 3 and snap mount 5.

The advantage of the snap mount 5 is the fast assembly of the housing 1, which merely has to be pressed into the fastening plate 3 and need not be screwed. By contrast to the prior art, the mounting of the housing occurs from only one side of the fastening plate 3, this yielding an additional facilitation. It should also be mentioned that only one part is now needed for insulation since perforated insulating washers or films are no longer required.

Although various minor changes and modifications might be proposed by those skilled in the art, it will be understood that our wish is to include within the claims of the patent warranted hereon all such changes and modifications as reasonably come within our contribution to the art.

We claim as our invention:

1. An electrical electrolyte capacitor assembly, comprising:
    a fastening plate;
    an electrolyte capacitor having a metallic housing, said housing having a male fastening member at a floor of the housing with assistance of which the capacitor is secured to the fastening plate in vibration-proof fashion;
    said male fastening member being fixed with a snap mount composed of an insulating material that is pressed in a bore of the fastening plate;
    a formed portion arranged on the snap mount for pressing the snap mount against the fastening plate; and
    the male fastening member having a constriction into which parts of the snap mount engage.

2. An assembly according to claim 1 wherein the snap mount has four slots.

3. An assembly according to claim 1 characterized in that a section of the male fastening member adjoining the constriction comprises a bevelled surface.

4. An assembly according to claim 1 wherein the formed portion of the snap mount comprises a bevelled surface.

5. An assembly according to claim 1 wherein the male fastening member is provided with an insulation member.

6. An assembly according to claim 5 wherein the insulation member is formed of a shrink hose.

7. An assembly according to claim 5 wherein the insulation member is formed of an insulating cap.

8. A capacitor assembly, comprising:

a metallic fastening plate having a mounting bore therethrough;

a capacitor having a metallic housing, said housing having a male fastening member protruding from a floor of the housing with assistance of which the capacitor is secured to the fastening plate in vibration-proof fashion;

said male fastening member being fixed with a snap mount composed of an insulating material, said snap mount having a mounting portion extending through said bore of said fastening plate, and a flat portion from which said mounting portion extends, said flat portion being sandwiched between said housing and said metallic fastening plate;

said mounting portion of said snap mount having a formed portion on an outer periphery thereof for pressing the snap mount flat portion against the fastening plate;

the male fastening member having a circular constriction; and said snap mount mounting portion having slotted parts at an end thereof opposite said flat portion for engaging with said constriction.

* * * * *